March 10, 1964 W. A. MERKL 3,123,953

METHOD OF MAKING PIEZOELECTRIC CRYSTALS

Filed Dec. 13, 1962

INVENTOR,
WALTER A. MERKL

BY

Harry M. Saragovitz
ATTORNEY 3,123,953

METHOD OF MAKING PIEZOELECTRIC CRYSTALS

Walter A. Merkl, Eatontown, N.J., assignor to the United States of America as represented by the Secretary of the Army Filed Dec. 13, 1962, Ser. No. 244,533
4 Claims. (Cl. 51—283)
(Granted under Title 35, U.S. Code (1952), sec. 266)

The invention described herein may be manufactured and used by or for the Government for governmental purposes without the payment of any royalty thereon.

This invention relates to piezoelectric crystal units and more particularly to a method of making such units extremely thin with plane parallel plate surfaces.

Quartz crystals vibrating in their thickness shear modes are in wide use for the control of high frequencies. Since the frequency response of a crystal is inversely proportional to the thickness, the crystal becomes extremely thin at the higher end of the frequency range. In fact, for some applications the most desirable results could only be secured with crystal plates having a thickness of .0005 inch. It is conventional practice to accomplish a reduction of thickness of crystal plates by mounting them on an optical flat and lapping them down. However, such prior techniques only permitted the plates to be lapped down to a thickness of about .001 inch.

The object of the present invention is to provide a simple and efficient method of producing crystal plates of ultra high parallelism and of very thin dimensions for use in high frequency apparatus.

For a more detailed description of the invention, together with other and further objects thereof, reference is had to the following description taken in connection with the acompanying drawing, wherein.

Figure 1:
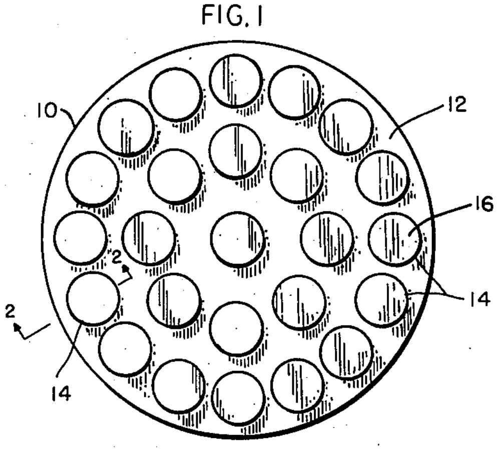
FIG. 1 is a top plan view of an optical flat used in the proces of the invention, showing a step in the process.

Referring now to FIG. 1 there is shown an optical flat or holder 10 having a smooth flat surface 12. Flat 10 preferably is of a circular shape and has a plurality of spaced piezoelectric crystal plates 14, such as natural or synthetic quartz, mounted thereon for concurrent processing. The plates 14 are preferably circular in contour having only one highly polished flat smooth face so that their thickness is many times that desired. A practical method of mounting plates 14 on flat 10 is by the conventional wringing-in process, whereby the polished flat smooth face of each of the plates are pressed down on surface 12 with a pointed wooden stick held against the exposed faces 16 of the plates.

Figure 2:
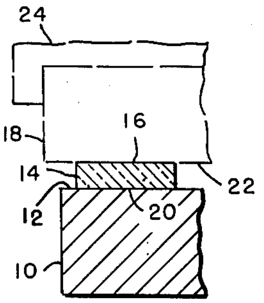
FIG. 2 is a fragmentary cross-sectional view, to an enlarged scale, of the apparatus shown in FIG. 1, the plane of section being indicated by the line 2—2 in FIG. 1, the view illustrating a further step of the process.

In FIG. 2 there is shown a fragmentary cross-sectional view of optical flat 10 with one of the plates 14 mounted thereon. Since all of the plates 14 are identical, only one plate will be described herein. The exposed face 16 of plate 14 is in contact with a lapping disc 18, shown in phantom; and the opposite polished flat smooth face 20 of plate 14 is secured to surface 12 of the flat 10. Disc 18 has a smooth flat surface 22 aligned opposite and in parallel relation to surface 12 of flat 10, and is rotatably mounted in a lapping machine 24, also shown in phantom.

The essential action of lapping machine 24 is well known in the art.

Briefly, optical flat 10 and rotatable disc 18 have opposite parallel plane surfaces 12 and 22, respectively, and disc 18 mounted in lapping machine 24 revolves in respect to flat 10. Simultaneously, disc 18 reciprocates back and forth so that a continuously varying portion of the exposed face of plate 14 is subjected to its action. A suitable lapping and polishing paste is applied between plate 14 and disc 18 in the conventional manner. The lapping and polishing action continues until the plate 14 is reduced to about 0.25 inch, with the exposed face 16 formed to optical flatness and smoothness, and parallel to both face 20 and to surface 12 of flat 10. At this point, the plate 14 is removed from flat 10 and its thickness is accurately measured. Conventional technique for removing a crystal plate from a flat is by inserting a razor blade between the edge of the plate and the flat.

Figure 3:
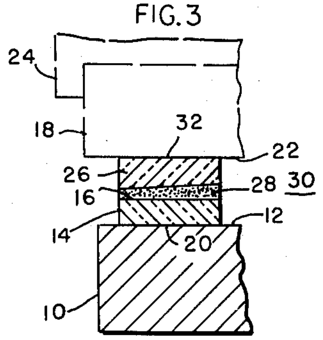
FIGS. 3 and 4 are fragmentary views similar to FIG. 2 and illustrating further steps of the process.

Referring to FIG. 3 which illustrates a further step in the process, a spacer 26 of the same piezoelectric material as crystal plate 14 is secured to face 16 of plate 14 with a conventional high temperature optical cement 28 to form a laminated structure 30. The cement 28 becomes part of the laminated structure 30, and any variation in its thickness will not effect the method of the present invention, as will be explained hereinafter. The laminated structure is shown wrung-in on flat 10 with face 20 of plate 14 secured to the flat. However, structure 30 may also be constructed such that face 16 of plate 14 could be in abutment with the flat. The free surface 32 of spacer 26 is then lapped and polished, by disc 18 and lapping machine 24, until surface 32 is made parallel to surface 12 of flat 10. The laminated structure 30 is now removed from flat 10.

Figure 4:
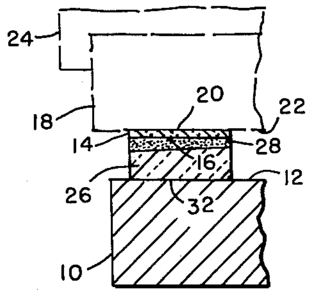

As shown in FIG. 4, laminated structure 30 is turned upside down, and is wrung-in on flat 10 with free surface 32 of spacer 26 contacting surface 12 of the flat. The opposite face 20 of the plate 14 is now lapped by disc 18 of lapping machine 24 to form a plate of the desired thickness and having a smooth flat face precisely parallel to surface 12 of flat 10. The laminated structure 30 is removed from the flat 10, the cement 28 is dissolved and the plate 14 is ready for use.

Thus, it can be seen that the face 16 of plate 14 is accurately parallel to face 20 since they have both been lapped parallel to flat 10, and any amount of quartz material can be lapped off face 20 of plate 14 by this method such that the plate is of the desired thickness.

Although the example described utilized a quartz crystal, it is to be understood that the process is applicable for laping and/or polishing extremely thin blanks of different materials such as germanium, silicon or ceramic crystals.

While there has been described what is at present a preferred embodiment of the invention, it will be obvious to those skilled in the art that various changes and modifications may be made therein without departing from the invention, it is herefore aimed in the appended claims to cover all such changes and modifications as fall within the true spirit and scope of the invention.

What is claimed is:

1. The method of making a piezoelectric crystal unit from a plate of crystalline material having a pair of opposing faces of which one is smooth and flat comprising the steps of mounting the smooth flat face of said plate on an optical flat, making the exposed face of said plate smooth, flat and parallel to said optical flat, detaching said plate from said optical flat, cementing a spacer to one of the parallel faces of said plate to form a laminated structure, mounting said laminated structure on said optical flat with the face of said plate abutting said optical flat and leaving a face of said spacer free, making the free face of said spacer smooth, flat and parallel to said optical flat, reversing said laminated structure on said optical flat such that the smooth flat face of said spacer abuts said optical flat and leaving a face of said plate uncovered, removing crystalline material from the uncovered face of said plate until the latter is reduced to the desired degree of thickness while leaving said uncovered face of said plate smooth, flat and parallel to said optical flat, detaching said laminated structure from said optical flat, and separating said plate from said laminated structure.

2. The method as set forth in claim 1, wherein said spacer consists of the same piezoelectric crystalline material as said plate.

3. The method as set forth in claim 2, wherein said plate and said spacer consists of quartz material.

4. The method as set forth in claim 1, wherein said plate is reduced to a thickness of .0005 inch.

References Cited in the file of this patent

UNITED STATES PATENTS

| | | |
|---|---|---|
| 2,151,736 | Broughton | Mar. 28, 1939 |
| 2,261,792 | Bokovoy | Nov. 4, 1941 |
| 2,340,843 | Bailey | Feb. 1, 1944 |
| 2,345,648 | Wolfskill | Apr. 4, 1944 |
| 2,375,003 | Kent | May 1, 1945 |
| 2,382,257 | Ramsay | Aug. 14, 1945 |
| 2,383,638 | Faber | Aug. 28, 1945 |
| 2,423,118 | Ramsay | July 1, 1947 |
| 2,440,348 | Root | Apr. 27, 1948 |
| 2,589,403 | Kurie | Mar. 18, 1952 |
| 2,687,603 | White | Aug. 31, 1954 |
| 2,705,392 | Imler | Apr. 5, 1955 |

UNITED STATES PATENT OFFICE

CERTIFICATE OF CORRECTION

Patent No. 3,123,953 March 10, 1964

Walter A. Merkl

It is hereby certified that error appears in the above numbered patent requiring correction and that the said Letters Patent should read as corrected below.

Column 2, line 12, for "0.25 inch" read -- .025 inch --.

Signed and sealed this 18th day of August 1964.

(SEAL)
Attest:

ERNEST W. SWIDER
Attesting Officer

EDWARD J. BRENNER
Commissioner of Patents